Jan. 4, 1966    J. C. TRANTHAM    3,227,210
PRODUCTION OF OIL BY FLUID DRIVE
Filed Dec. 9, 1963
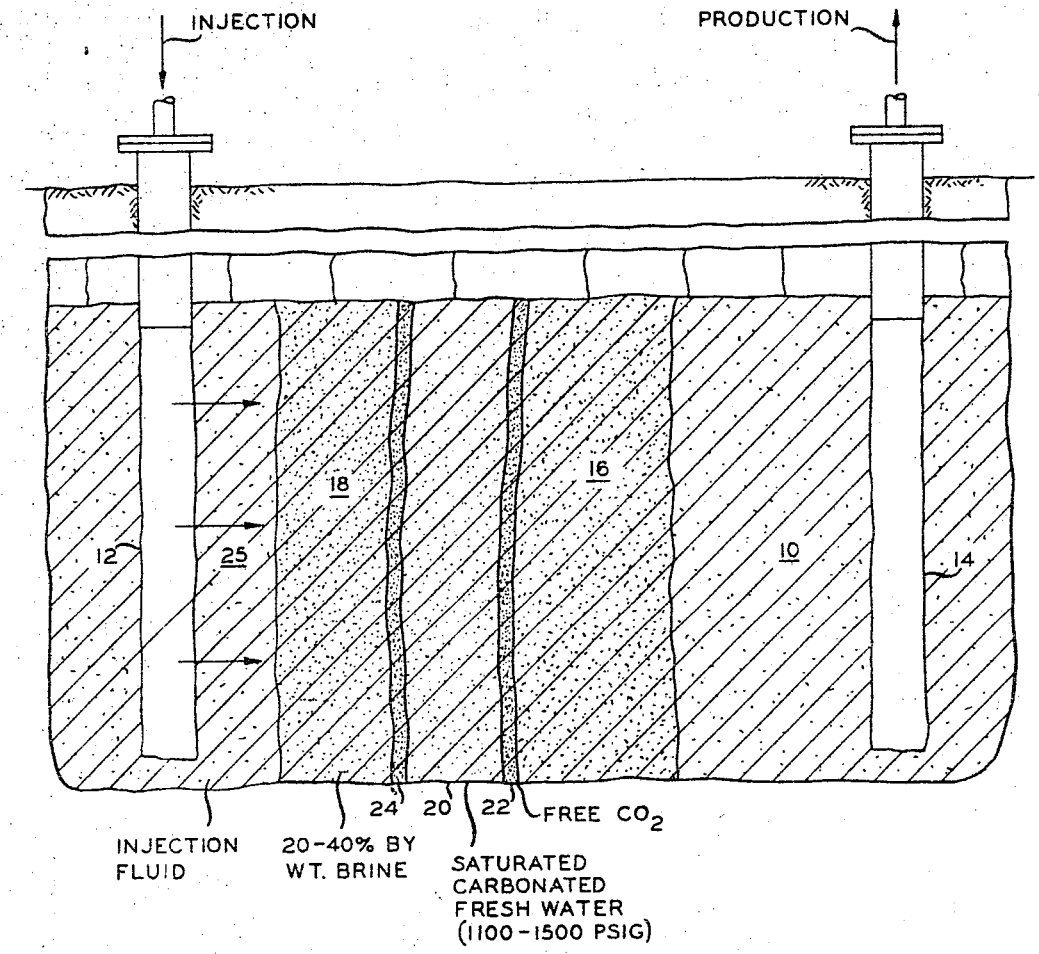
INVENTOR.
J. C. TRANTHAM
BY
ATTORNEYS : 3,227,210
PRODUCTION OF OIL BY FLUID DRIVE
Joseph C. Trantham, Bartlesville, Okla., assignor to Phillips Petroleum Company, a corporation of Delaware
Filed Dec. 9, 1963, Ser. No. 328,956
4 Claims. (Cl. 166—9)

This invention relates to a method or process for producing oil from an oil reservoir by fluid drive, utilizing in situ generated $CO_2$.

The recovery of oil by fluid drive utilizing various fluids is conventional in the petroleum production art. The utilization of liquid and gaseous carbon dioxide in the displacement of oil from porous media has been demonstrated in laboratory experiments by Beeson and Ortloff, Transactions of the American Institute of Mining, Metallurgical and Petroleum Engineers, 216, 388 (1959). In utilizing liquid $CO_2$ the process suffers from some of the same disadvantages as are experienced with liquid propane and liquid butane as the displacing and driving agents, viz., instability of the displacement front and premature breakthrough of the displacing agent. This difficulty can be reduced or eliminated by the generation of liquid carbon dioxide in situ so that the liquid $CO_2$ bank grows in volume as it moves away from the injection well s into the formation and its tendency to become narrower is offset.

This invention is concerned with a method of producing oil from an oil reservoir utilizing $CO_2$ produced in situ so as to eliminate the disadvantages set forth above.

Accordingly, it is an object of the invention to provide an improved process for the fluid displacement or drive of oil. A further object is to provide a process for producing oil by fluid drive utilizing $CO_2$ as the principal displacing medium. Other objects of the invention will become apparent from consideration of the accompanying disclosure.

A broad aspect of the invention comprises injecting alternate slugs of concentrated brine and fresh water saturated with $CO_2$ at elevated pressure into an oil reservoir through an injection well and driving the injected slugs through the reservoir to a production well to recover oil therefrom. A convenient and efficient method comprises injecting the slugs through the center well of a five, seven or nine-spot pattern and producing through the ring wells. It is also feasible and advantageous to utilize the injection and production techniques with different well patterns disclosed in U.S. applications S.N. 129,422, filed August 4, 1961, now U.S. Patent No. 3,-120,820, and S.N. 223,298, filed September 10, 1962, of Melcon Santourian.

The amount of each slug injected should be in the range of about three to ten percent of the pore volume in the well pattern to be produced, and preferably about five percent of the pore volume. The salts used in the brine may be sodium, calcium or magnesium chloride. The brine obtained from well formation is ordinarily sufficiently concentrated for use in the process; however, if such is not the case, additional salt may be introduced in solution to bring the concentration within the range of 20 to 40 percent by weight.

The first slug of brine is followed by a slug of fresh water saturated with $CO_2$ at a pressure in the range of 1100 to 1500 p.s.i.g. and this water-$CO_2$ slug is then followed by a second slug of brine. The alternate slugs of brine and $CO_2$-containing water are followed by injection of regular injection water to drive the slugs through the reservoir toward the production well s. The pressure during the drive is maintained in the range at which the carbonated water was saturated, i.e., 1100 to 1500 p.s.i.g.

As the system of slugs is driven through the formation, mixing occurs between the brine and the carbonated water at the leading and trailing interfaces of the carbonated water slug with the brine slug. Since the salt content of the fresh water increases during this movement, the carbon dioxide in the fresh water slug is salted-out. Of course, some of the salted-out $CO_2$ dissolves in the brine slug, but because of the low solubility of carbon dioxide in the concentrated brine, a major portion of it remains insoluble and this separate, insoluble portion has a desirable displacing effect on the reservoir oil.

For reservoirs whose temperatures are below the critical temperature of $CO_2$ (88° F.), the carbon dioxide forms a liquid bank at the pressures used in the process. (This can be lower for lower reservoir temperatures.) As the slugs move through the reservoir, the zones of miscibility at the leading and trailing edges (or interfaces) of the carbonated water grow and cause the two banks of liquid carbon dioxide to become larger. Thus the reservoir is swept by a system of slugs as illustrated in the drawing, referred to below. The tendency of the first carbon dioxide bank to become unstable is resisted by the growth of the volume of liquid carbon dioxide and is backed up by the second liquid carbon dioxide bank. In this way a high efficiency sweep results. When the temperature is above the critical temperature of $CO_2$, the $CO_2$ in gaseous phase effects a similar sweep of the reservoir.

The invention is further illustrated by reference to the accompanying schematic drawing which is an elevation through a reservoir showing the injected slugs in place at a given step of the process.

Referring to the drawing a stratum or reservoir 10 is penetrated by an injection well 12 and a production well 14. Well 12 may be a center well of a five, seven or nine-spot pattern while well 14 may be one of the ring wells of said pattern. It is also feasible to provide a line of injection wells 12 with a line of production wells 14 on either side of the injection wells. Numerals 16 and 18 designate saturated brine slugs with saturated carbonated fresh water slug 20 therebetween. Free carbon dioxide is shown at 22 and 24 at the leading and trailing edges or interfaces of the $CO_2$-containing slug. It is also feasible to inject a second slug of the saturated carbonated water behind slug 18 and follow this with a third slug of brine. Injection fluid is indicated at 25 after it enters the reservoir through injection well 12. As the injection of driving fluid is continued, slugs 16, 18 and 20 along with the $CO_2$ zones of miscibility 22 and 24 are driven through the stratum 10 to production well 14 and the produced oil is recovered therefrom.

Reasonable variation and modification are possible within the scope of the foregoing disclosure, the drawing and the appended claims to the invention.

I claim:
1. A process for producing oil from an oil reservoir penetrated by an injection well and a production well, comprising the steps of:
 (1) injecting a slug of concentrated brine into said reservoir thru said injection well toward said production well;

(2) thereafter, injecting a slug of fresh water saturated with $CO_2$ at a pressure in the range of 1100 to 1500 p.s.i.g. into said reservoir as in step (1) while maintaining the injection pressure in said range;
(3) repeating step (1) after step (2) to provide alternate sections in the reservoir containing injected brine and water saturated with $CO_2$, whereby $CO_2$ is salted-out at the interfaces between the slugs; and
(4) driving the injected fluids toward said production well so as to produce oil from said reservoir thru said production well.

2. The process of claim 1 wherein step (4) is effected by injecting water thru the injection well.

3. The process of claim 1 wherein the slugs of brine and water saturated with $CO_2$ are in the range of about 3 to 10 percent of the pore volume of the reservoir area being produced.

4. A process for producing oil from an oil reservoir penetrated by wells in one of a 5, 7 and 9-spot pattern comprising the steps of:
(1) injecting a first slug of concentrated brine (20–40 weight percent salt) thru at least one of the wells in said pattern into the reservoir toward at least one production well in said pattern;
(2) following step (1), injecting a second slug of fresh water saturated with $CO_2$ at a pressure in the range of 1100–1500 p.s.i.g. behind and adjacent said first slug while maintaining the pressure in said range;
(3) repeating step (1) so as to position a third slug of brine adjacent said second slug;
(4) and injecting water behind said third slug as a driving fluid so as to drive said slugs thru the reservoir toward said at least one production well; and
(5) recovering oil produced by the foregoing steps.

References Cited by the Examiner
UNITED STATES PATENTS

| | | | |
|---|---|---|---|
| 2,875,833 | 3/1959 | Martin | 166—9 |
| 3,065,790 | 11/1962 | Holm | 166—7 X |
| 3,120,870 | 2/1964 | Santourian | 166—9 |

CHARLES E. O'CONNELL, *Primary Examiner.*

BENJAMIN HERSH, *Examiner.*